Oct. 5, 1965   R. E. SCHWARTZ   3,209,784
HEIGHT CONTROL VALVE
Filed April 25, 1963   4 Sheets-Sheet 1

INVENTOR
ROBERT E. SCHWARTZ
BY *Joseph E. Papin*

INVENTOR
ROBERT E. SCHWARTZ
BY Joseph E. Papin

Oct. 5, 1965   R. E. SCHWARTZ   3,209,784
HEIGHT CONTROL VALVE
Filed April 25, 1963   4 Sheets-Sheet 3

INVENTOR
ROBERT E. SCHWARTZ
BY Joseph E. Papin

United States Patent Office 3,209,784
Patented Oct. 5, 1965

3,209,784
HEIGHT CONTROL VALVE
Robert E. Schwartz, Clayton, Mo., assignor to Wagner Electric Corporation, St. Louis, Mo., a corporation of Delaware
Filed Apr. 25, 1963, Ser. No. 275,632
20 Claims. (Cl. 137—627.5)

This invention relates to fluid pressure suspension systems and in particular to a height control valve therein.

In the past, an undamped height control valve controlled a fluid pressure spring interposed between the sprung and unsprung masses of a vehicle fluid pressure suspension system to normally maintain a predetermined distance between said masses and provide a relatively constant low road clearance and low ride position for said vehicle. When the distance between the masses was necessarily increased by normal functioning of the height control valve to a raised position, required for entering driveways, passing obstacles, and rough roadways, etc., said masses were undesirably moved into abutment with the vehicle rebound stops which fixedly limited the movement of said masses. In this undesirable abutting position of the vehicle masses, the driving range or speed of the vehicle was necessarily appreciably reduced to prevent damage to the fluid pressure springs, the shock absorbers and the rest of the vehicle components and equipment responsive to movement between the sprung and unsprung masses. Further, the previous height control valves were necessarily mounted in a position which was at a right angle to the actuating arm therefor. This particular right angular mounting position was undesirable due to inadequate or unaccessible supporting members for the control valves. Further, this predetermined position between the control valve and actuating arm therefor necessitated an undesirable adjustable linkage to connect said actuating arm with the unsprung vehicle mass. Through usage, the adjustable linkage became misaligned or mis-adjusted which effected undesirable compensation by the control valve.

An object of the present invention is to provide a height control valve which is controllably operable between a normal riding position and a raised riding position.

Another object of the instant invention is to provide a height control valve having integral adjustment means to position the actuating arm therefor and obviate adjustment linkage in said actuating arm.

Another object of the instant invention is to provide a height control valve which can be mounted in any position relative to the actuating lever therefor.

Still another object of the present invention is to provide a height control valve with a normal control position which is automatically operable to control in a second or another position.

Still another object of the present invention is to provide a height control valve having an orificed outlet or working port with self-leaning means therein.

A further object of the present invention is to provide a height control valve having control gearing which is initially adjustable to predetermine the desired operating position of the sprung and unsprung masses of the vehicle.

A still further object of the present invention is to provide a height control valve having control gearing which is adjustable to normally function at the center position thereof.

These and other objects and advantages will become apparent hereinafter.

Briefly, the present invention is embodied in a control valve device for an air spring including relatively rotatable and axially movable gearing mechanism operable in response to displacement of a cooperating actuating lever from a selected operating position to provide correcting ingressing or egressing pressure fluid flow for said air spring to return said lever to the selected operating position. The invention also embodies means adjustably connected with the gearing mechanism to transpose said actuating lever into another selected operating position.

This invention also consists in the parts and in the arrangement and combination of parts hereinafter described and claimed. In the accompanying drawings which form a part of this specification and wherein like numerals refer to like parts wherever they occur:

Figure 1:
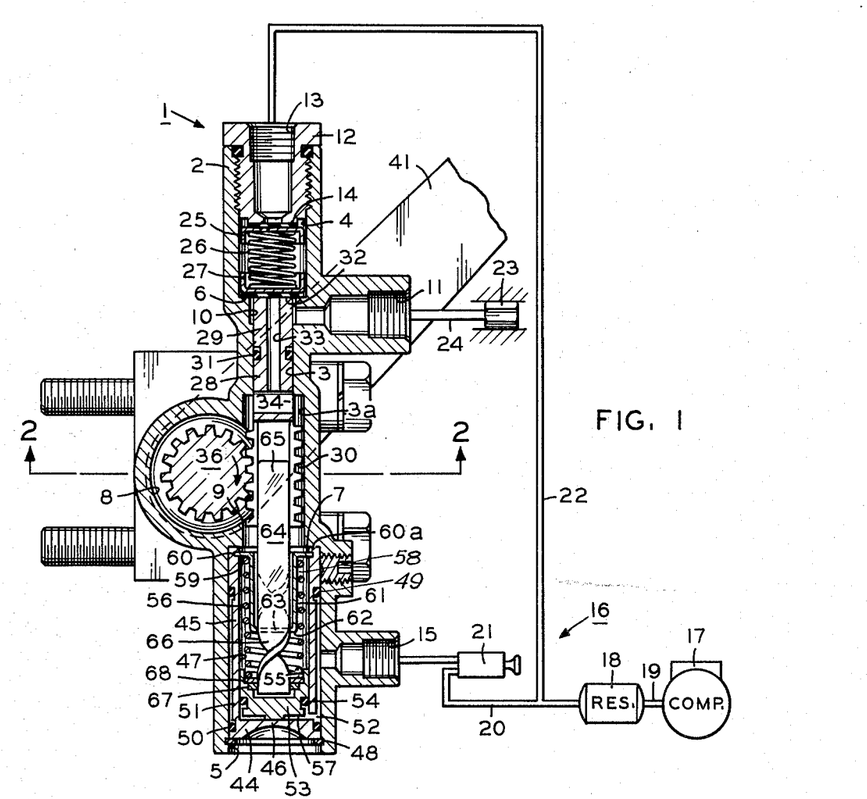
FIG. 1 is a diagrammatic view of a pressure fluid suspension system showing a control valve embodying the present invention therein in cross section.
Figure 2:
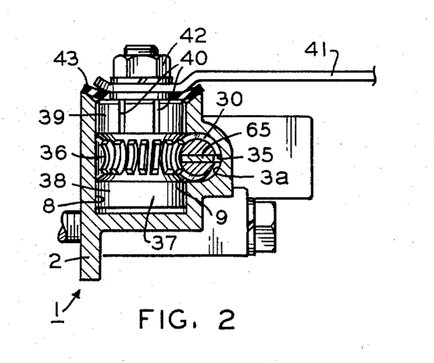
FIG. 2 is a cross-sectional view taken along line 2—2 of FIG. 1.

Referring now to FIGS. 1 and 2, a height control valve, indicated generally at 1, is provided with a housing 2 which is normally mounted on or connected with the vehicle sprung mass (not shown). The housing 2 is provided with intermediate stepped bores 3 and 3a having upper and lower counterbore 4 and 5 axially aligned therewith, and shoulders 6 and 7 are formed at the juncture of the stepped bore 3 and counterbore 4 and the juncture of stepped bore 3a and counterbore 5, respectively. A transverse bore 8 is also provided in the housing 2 intersecting with the stepped bore 3a at 9. An annular recess or passage 10 is provided at the upper end of the stepped bore 3 having one end intersecting with the housing shoulder 6, and on outlet or working port 11 is provided in the housing 2 intersecting with said annular recess adjacent the other end thereof. A fitting 12 is threadedly received in the open end of the upper counterbore 4 having an inlet passage or port 13 therethrough, and a valve seat 14 (to be discussed later) is provided on the lower or interior end of said fitting in circumscribing relation with said inlet port. The housing 2 is also provided with a control port 15 which intersects the lower counterbore 5 adjacent the mid-portion thereof.

A fluid pressure system, indicated generally at 16, is provided to control the height control valve 1 and includes a compressor 17 connected with a reservoir 18 by a conduit 19, said compressor and reservoir forming a source of fluid pressure. The reservoir 18 is connected with the control port 15 by a conduit 20, and a conventional push-pull type control valve 21 is interposed in said conduit having a normal position which exhausts said control port to the atmosphere and interrupts communication between said reservoir and control port. Another conduit 22 has one end connected with the inlet port 13 while the other end thereof intersects with the conduit 20 between the reservoir 18 and control valve 21. To complete the system 16, the outlet port 11 is connected to an expansible air spring 23 by another conduit 24, said air spring being positioned between the vehicle sprung and unsprung masses (not shown).

A unidirectional check valve 25 is normally urged into sealable engagement with the inlet valve seat 14 by a valve spring 26, and said valve spring also normally urges another unidirectional check valve 27 into sealing engagement with the housing shoulder or valve seat 6. A valve operating or driven member 28 is provided with an upper tubular exhaust stem portion 29 and a lower worm gear portion 30 (to be discussed hereinafter). The stem 29 is slidably received in the stepped bore 3 and extends coaxially through the annular recess 10, and O-ring seal 31 is carried on said stem in sealing engagement with said stepped bore. An exhaust valve seat 32 is provided on the upper end of the stem 29 normally in sealing engagement with the check valve 27 and in circumscribing relation with one end of an axial exhaust passage 33 provided in said stem, and the other end of the exhaust passage 33 is intersected by a cross passage 34 provided near the mid-portion of said stem and connecting said exhaust passage in communication with the stepped bore 3a. A vertical slot or keyway 35 is provided in the worm gear 30 of the valve operating member 28 extending between the lower or free end thereof and the cross passage 34, and said worm gear is normally meshed with a pinion gear 36 integrally formed on a gear control member 37 between trunnions 38 and 39 which are rotatably mounted in the transverse bore 8. The trunnion 39 is provided with transverse passages 40 in the peripheral surface thereof which serve as exhaust ports. The gear control member 37 is connected with one end of an actuating lever or arm 41 by suitable means, such as a stud and lock washer assembly 42, and the other end thereof is connected with the unsprung mass of the vehicle. A resilient washer or boot 43 is interposed between the lever 41 and the housing 2 about the open end of the transverse bore 8 to prevent the entry of foreign particles thereinto while permitting exhaust pressure fluid flow.

Figure 3:
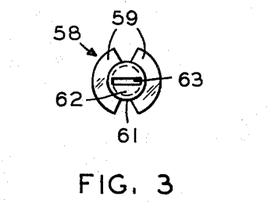
FIG. 3 is a top view of a cage member which forms an essential part of the control valve of FIG. 1.

Referring now to FIGS. 1 and 3, a bore closure member or cylinder 44 is provided with an annular side wall 45 and an integrally formed base wall 46 defining a bore 47 therein. The cylinder 44 is rotatably received in the lower housing counterbore 5 having the upper or open end thereof positioned in rotatable engagement on the housing shoulder 7, and a snap ring 48 is carried in the lower end of the counterbore 5 in engagement with the cylinder base wall 46 to retain the cylinder 44 against vertical displacement from said counterbore. Spaced O-rings 49 and 50 are carried in the peripheral surface of the cylinder side wall 45 in sealing engagement with the counterbore 5, and an annular recess 51 is provided in the peripheral surface of said cylinder side wall between said O-rings in pressure fluid communication at all times with the control port 15. A passage 52 is interposed between the cylinder bore 47 and recess 51 adjacent the cylinder base wall 46 to provide open pressure fluid communication therebetween at all times, and a control piston 53 is slidably received in said cylinder bore. The control piston 53 carries an O-ring seal 54 which is sealably engaged with the cylinder bore 47 and is provided with an annular stepped recess 55 in the upper end surface thereof. The control piston 53 is normally biased into abutment with the cylinder base wall 46 by the negligible compressive force of a return spring 56 which is received in the recess 55, and an expansible control chamber 57 is formed in the cylinder bore 47 between the lower end surface of said control piston and said cylinder base wall in open pressure fluid communication with the passage 52.

A guide or cage member 58 is provided with radially extending flanges 59 which are fixedly positioned in an annular recess 60 provided in the upper end of the cylinder bore 47 by suitable means, such as staking at 60a. A depending tubular portion 61 is integrally formed with the flanges 59 and protrudes coaxially into the cylinder bore 47, and an end wall 62 having a guide slot or keyway 63 therein is integrally provided on the lower end of the tubular portion 61. A driving member 64 is provided with a key 65 forming the upper portion thereof which is slidably and drivingly received in the keyway 35 in the worm gear 30 of the driven member 28 and also with a helical key or gear 66 forming the lower portion thereof. The helical gear 66 is slidably received in the guide slot 63 of the cage member 58, and the lower end of said helical gear is fixedly connected with a washer 67 which is rotatably received in the smaller portion of the stepped recess 55 of the control piston 53. To complete the control valve 1, a retaining washer 68 is positioned in the larger portion of the stepped recess 55 to receive the force of the lower end of the return spring 56 and retain the washer 67 against vertical displacement from said recess, the upper end of said spring being biased into engagement with the flanges 59 of the cage member 58.

In the operation in order to supply an ingress fluid pressure flow from the reserve 18 to the air springs 23 to initially inflate said air springs to a normal operating position and attain the desired riding height or distance between the sprung and unsprung masses, the operator rotates the cylinder 44 in the counterbore 5 which also imparts rotary movement to the cage member 58. Rotation of the cage member 58 effects operative engagement of the slot 63 therein with the driving member 64 and imparts a rotational movement thereto. The rotary motion of the driving member 64 is then imparted to the driven member 28 and to the worm gear 30 thereon through the driving engagement between the driving member key 65 and the keyway 35 to rotate said worm gear upwardly on the pinion gear 36. This resulting upward movement of the worm gear 30 also concertly moves the valve stem portion 29 upwardly to engage the valve seat 32 with the check valve 27 and close the exhaust passage 33. Further upward movement of the stem 29 disengages the check valve 27 from the valve seat 6 to permit ingress pressure fluid flow from the reservoir 18 through the conduits 20 and 22 and the inlet port 13 to disengage the check valve 25 from the valve seat 14, through the counterbore 4, the annular recess 10 in the housing bore 3, the outlet port 11 and the conduit 24 into the air spring 23. In this manner, inflation of the air spring 23 moves the sprung mass upwardly relative to the unsprung mass which effects a resulting clockwise rotation (in the direction of the arrows) of the actuating lever 41 and pinion gear 36. The clockwise rotation of said pinion gear 36 moves the worm gear 30 and driven member 28 downwardly so that said pinion gear is again engaged with the center or mid-portion of said worm gear. The downward movement of the driven member 28 allows the check valve 27 to re-engage the valve seat 6 interrupting pressure fluid communication between inlet and outlet ports 13 and 11 while maintaining the stem valve seat 32 in sealing engagement with said check valve closing the exhaust passage 33. The above-described operation for initially inflating the air springs can be repeated until the desired riding height or normal operating position is attained.

In order to deflate the air springs to a normal operating position to attain the desired riding height, it is, of course, obvious that the control cylinder 44 can be rotated in the opposite direction to impart an opposite rotation to the driving member 64 and driven member 28. This opposite rotary movement of the driven member 28 serves to move the worm gear 30 downwardly on the pinion gear 36. As a result, the stem valve seat 32 is disengaged from the check valve 27 to effect egress or exhaustion pressure fluid flow from the air spring 23, through the conduit 24, the outlet port 11, the recess 10 in the housing bore 3, the exhaust passage 33 and cross passage 34 in the stem 29 into the housing bore 3a and therefrom between the worm gear 30 and pinion gear 36 into the transverse bore 8 and through the exhaust passages 40 in the trunnion 39 to atmosphere. Such deflation of the air spring 23 causes movement of the sprung mass toward the unsprung mass which effects resultant counterclockwise rotation of the actuating lever 41 and pinion gear 36. The counterclockwise rotation of the pinion gear 36 moves the worm gear 30 and driven member 28 upwardly to re-engage the stem valve seat 32 with the check valve 27 closing the exhaust passage 33. In this manner, the check valve 27 is maintained in engagement with the valve seat 6 interrupting pressure fluid communication between the inlet and outlet ports 13 and 11, and the stem valve seat 32 is positioned in engagement with said check valve interrupting pressure fluid communication between the outlet port 11 and the exhaust ports 40 in the control gear trunnion 39.

With the sprung mass positioned in the normal operating position, any increase or decrease in the weight carried by the sprung mass results in a displacement thereof from the normal operating position and the height control valve 1 is operable to effect a correcting egress or ingress flow of pressure fluid from or to the air spring 23. For instance, if the sprung mass is displaced above the normal operating position, the upward movement of said sprung mass effects resultant clockwise rotation of the actuating lever 41 and pinion gear 36, and said pinion gear moves the worm gear 30 and driven member 28 downwardly to effect egress or exhaustion pressure fluid flow from the air spring 23; however, as the sprung mass is returned downwardly to the normal operating position by such air spring deflation, the actuating lever 41 and pinion gear 36 are moved in a counterclockwise direction to move the worm gear 30 and driven member 28 back to their original or normal operating positions wherein pressure fluid communication is interrupted between the inlet and outlet ports 13 and 11 and between outlet and exhaust ports 11 and 40. From the above, it is obvious that the movement of the component parts of the height control valve 1 are reversed when the riding height of the vehicle is decreased from that desired to effect a compensating ingress pressure fluid flow to the air spring 23.

In some instances, the vehicle sprung mass must be raised from the desired riding height to prevent damage to the vehicle undercarriage, such as when entering driveways, driving in deeply rutted roads, or passing over obstacles in the road, or the like. In order to effect operation of the height control valve 1 to its raised position, the operator merely actuates the push-pull valve 21 from its normally closed or exhausting position to its open position allowing pressure fluid to flow from the reservoir 18 through the conduit 20 into the control port 15 and therefrom between the housing counterbore 5 and control cylinder recess 51 through the passage 52 into the control piston 53 to move said control piston upwardly the control chamber 57 acts on the effective area of the control piston 53 to move said control pitson upwardly in the cylinder bore 47 which, in turn, moves the helical gear 66 of the driving member 64 through the slot 63 of the cage member 58 imparting rotation to said driving member and the key 65. The rotary movement of the driving member key 65 is imparted to the driven member 28 causing the worm gear 30 to move upwardly on the pinion gear 36 which, of course, results in concert upward movement of the stem 29 to disengage the check valve 27 from the valve seat 6 and open pressure fluid communication between inlet and outlet ports 13 and 11 permitting ingress pressure fluid flow from the reservoir 18 to the air spring 23, as previously described. In this manner, the air spring 23 is inflated to move the sprung mass to the raised position from the normal riding height, and such movement of said sprung mass effects resultant clockwise rotation of the actuating lever 41 and pinion gear 36 to again return the driven member 28 downwardly to its normal operating position wherein pressure fluid communication is interrupted between inlet and outlet ports 13 and 11 and between outlet and exhaust ports 11 and 40. Further, such downward movement of the driven member 28 once again meshes the mid-portion of the worm gear 30 with the pinion gear 36.

To revert from the raised operating position to the normal operating position or desired riding height, the push-pull valve 21 is again moved to its normal exhaust position to exhaust the fluid pressure from the control chamber 57 through the passage 52, between the control cylinder recess 51 and housing counterbore 5 into the control port 15 and therefrom via the conduit 20 and said push-pull valve to the atmosphere. Upon exhaustion of pressure fluid from the control chamber 57, the piston return spring 56 moves the control piston 53 and driving member 64 downwardly in the cylinder bore 47 to their original positions. The downward movement of the helical gear 66 through the cage slot 63 imparts an opposite rotary movement to the key 65 and driven member 28; therefore, the worm gear 30 of said driven member is moved downwardly on the pinion gear 36, and the stem 29 is, of course, concertly moved downwardly therewith. In this manner, the stem valve seat 32 is again disengaged from the check valve 27 opening the exhaust passage 33 and establishing exhaust pressure fluid communication between outlet and exhaust ports 11 and 40 to exhaust or egress pressure fluid from the air spring 23. As the air spring 23 is deflated to return the sprung mass downwardly to the desired riding height, a resultant counterclockwise movement is imparted to the actuating lever 41 and pinion gear 36 which returns the driven member stem 29 to its normal position wherein the mid-portion thereof is engaged with said pinion gear, as previously described.

Figure 4:
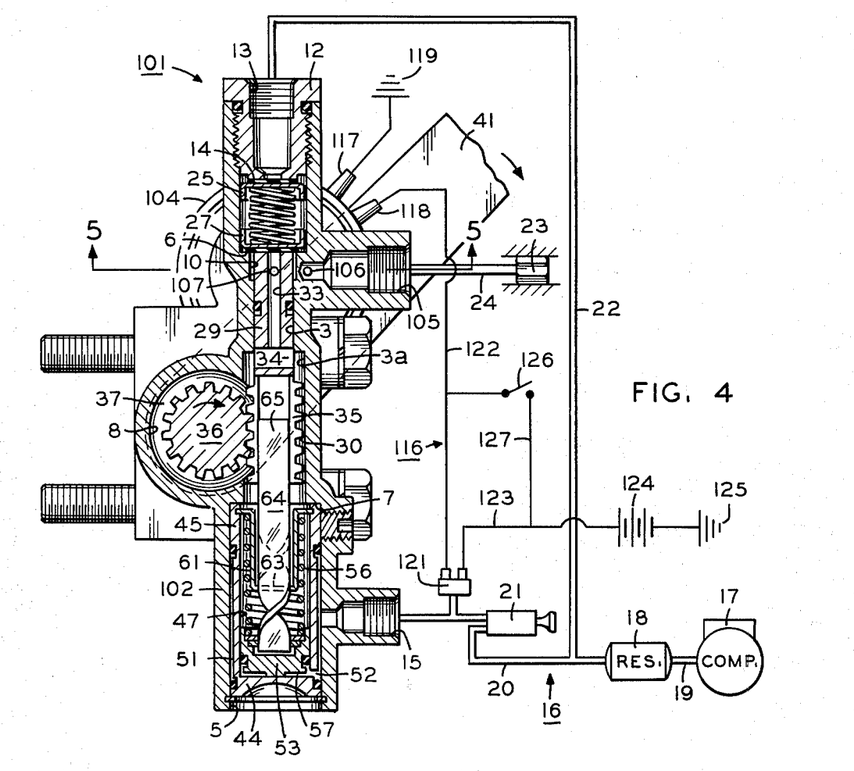
FIG. 4 is a diagrammatic view of a pressure fluid suspension system showing a modification of the control valve embodying the present invention therein in cross section.
Figure 5:
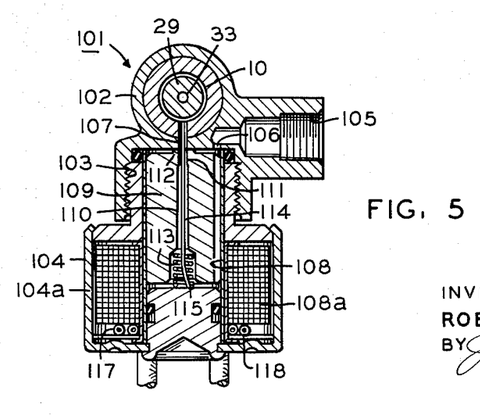
FIG. 5 is a cross-sectional view taken along the line 5—5 of FIG. 3.

Referring now to FIGS. 4 and 5, a height control valve 101 is shown having substantially the same component parts and functioning in the system 16 in substantially the same manner as the previously described height control valve 1 with the following exceptions. The control valve 101 is provided with a housing 102 having a cross bore 103 near the upper end thereof and a damping solenoid valve 104 is provided with a housing 104a which is threadedly received in said cross bore. A working port 105, which receives the conduit 24, is provided in the housing 102, and a passage 106 connects said working port with the cross bore 103. Another passage 107 which is axially aligned with the cross bore 103 has one end intersecting with the end wall of said cross bore and the other end thereof intersecting with the recess 10. The solenoid housing 104a is provided with a bore 108 and coils 108a for magnetically energizing a plunger 109 which is slidable in said bore, and said plunger is provided with an axial passage 110 with a restricted portion or orifice 111 therein. A valve seat 112 is provided on the plunger 109 in circumscribing relation with the passage 110, and a spring 113 normally biases said plunger to a flow restricting position wherein said valve seat is sealably engaged with the end wall of the cross bore 103 about the passage 107. An orifice cleaning member or wire 114 extends through the plunger orifice 111, the plunger passage 110 and the housing passage 107, and one end of said member is bent at 115 and positioned in abutting engagement between the plunger spring 113 and the solenoid housing 104a.

An electrical circuit indicated generally at 116, is provided to energize the solenoid 104 which is provided with terminals 117 and 118 suitably connected with the coils 108a. The solenoid terminal 117 is grounded at 119 and the solenoid terminal 118 is connected to one terminal of a make or break type, fluid pressure responsive electrical switch 121 by a lead 122. The switch 121 is connected in pressure fluid communication with the conduit 20 of the fluid pressure system 16 between the push-pull valve 21 and the control port 15. The other terminal of the make or break switch 121 is connected by a lead 123 with a battery 124 which is grounded at 125. While only one normally open switch 126 is shown interposed in the lead 127 which is connected to leads 122 and 123, across the terminals of the make or break switch 121, it is apparent that more than one such normally open switch could be connected in parallel with the switch 126 to represent vehicle door jam switches and/or a trunk lid switch which are provided to operate vehicle dome lights and trunk lights or the like.

In the operation of the height control valve 101, assume a passenger opens a door and alights from the vehicle so that the load on the sprung mass is decreased causing upward displacement of said sprung mass from the normal operating position. The opening of the vehicle door causes the door jam switch 126 to close completing the electrical circuit from the battery 124 through leads 123, 127, 122 and the solenoid terminal 118 to energize the solenoid coils 108a. Energization of the solenoid coils 108a magnetically effects movement of the solenoid plunger 109 to its non-flow restricting position against the negligible force of the plunger spring 113 and disengages the plunger valve seat 112 from the end wall of the housing cross bore 103. With the plunger so energized to this non-flow restricting position, unrestricted egress pressure fluid flow is permitted from the air spring 23 through the conduit 24, the working port 105, the passage 106, the cross bore 103 and the passage 107 into the recess 10. Since the load on the unsprung mass was decreased, a resultant clockwise rotation (in the direction of the arrows) of the lever 41 and pinion gear 36 is effected to move the worm gear 30 and driven member 28 downwardly. Downward movement of the driven member 28 unseats the exhaust valve seat 32 from the check valve 27 to communicate the annular recess 10 in the housing bore 3 with the exhaust ports 40, as previously described, and effects egress or exhaustion pressure fluid flow from the air spring 23. As the air spring 23 is deflated to return the sprung mass to its normal operating position, a resultant counterclockwise rotation of the lever 41 and pinion gear 36 is effected which moves the worm gear 30 and driven member 28 upwardly to sealably reengage the exhaust valve seat 32 on the stem 29 with the check valve 27 closing the exhaust passage 33 and interrupting the egress flow. When the alighted passenger closes the vehicle door, the door jam switch 126 is opened breaking the circuit 116 and de-energizing the solenoid 104. Upon de-energization of the solenoid 104, the spring 113 returns the plunger 109 to its normal flow restricting position engaging the plunger seat 112 with the end wall of the cross bore 103 about the passage 107. Of course, it is apparent that if the vehicle load is increased, such as by a passenger opening the vehicle door and entering the vehicle, the circuit 116 is completed in the same manner to permit the unrestricted passage of pressure fluid flow, and the valve 101 functions in the same manner as the previously described valve 1 to effect the ingress pressure fluid flow and inflate the air spring 23 to the normal operating position.

In the event the sprung mass is moved to the raised position by the operator, as previously described, the normally open pressure responsive make or break switch 121 is actuated to its closed position by the fluid pressure supplied when the push-pull valve 21 is moved to its open position to complete the electrical circuit 116. Energization of the solenoid coils 108a magnetically effects movement of the plunger 109 to its non-flow restricting unseating the valve seat 112 and permitting unrestricted pressure fluid flow through the solenoid 104 to the air spring 23, as previously described.

It is apparent that the ingress and egress pressure fluid flow in response to oscillatory movement of the lever 41 due to undesired displacement of the sprung mass, such as that caused by bumps in the roadway, vibration or the like, will be minimized since the ingress flow is provided a restricted and tortuous path passing through the recess 10, the passage 107 and therefrom through the plunger passage 110 and restricted orifice 111, between the peripheral hexagonally-shaped surface of the plunger 109 and the solenoid housing bore 108, through the passage 105, the working port 106 and the conduit 24 into the air spring 23. Of course, this restricted and tortuous flow path is reversed for egressing pressure fluid flow which is exhausted through the stem exhaust passage 33 to the exhaust ports 40, as previously described. Therefore, when undesirable oscillatory movements of the lever 41 causes the driven member 28 to "hunt" between an inlet check valve opening position and an exhaust passage opening position, the accompanying ingress and egress flow of pressure fluid is minimized by providing a severely restricted and tortuous flow path, as above described. This tortuous and restricted flow path also provides for a relatively slow adjustment to the normal operating position when the pressure fluid in the air spring is quickly subjected to severe ambient temperature changes.

Figure 6:
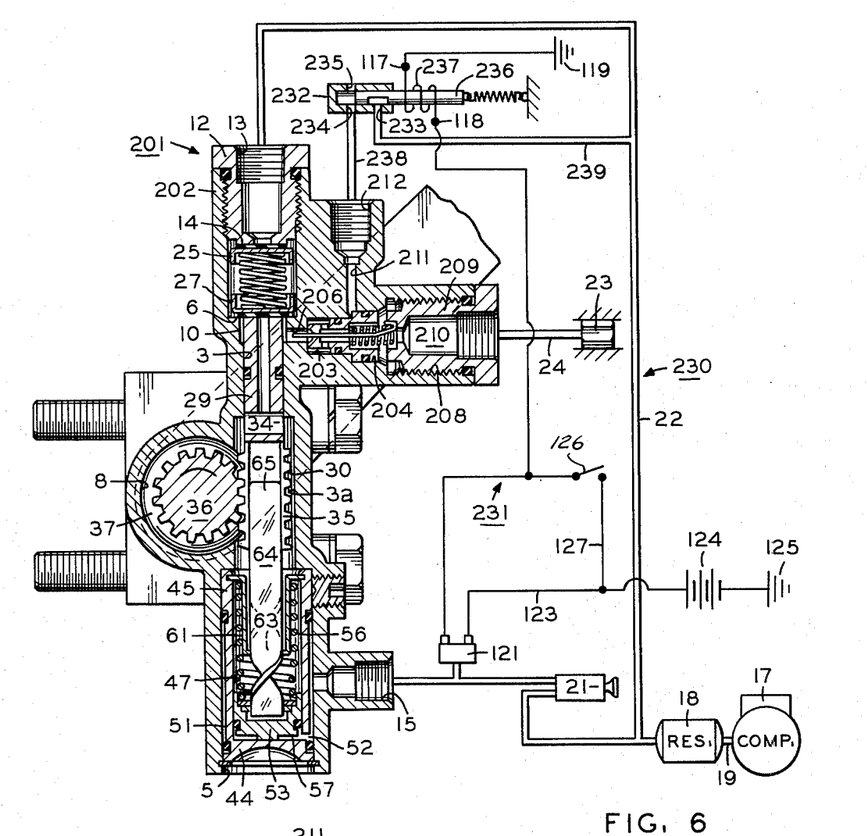
FIG. 6 is a diagrammatic view of a pressure fluid suspension system showing a modification of the control valve embodying the prevent invention therein in cross section.
Figure 7:
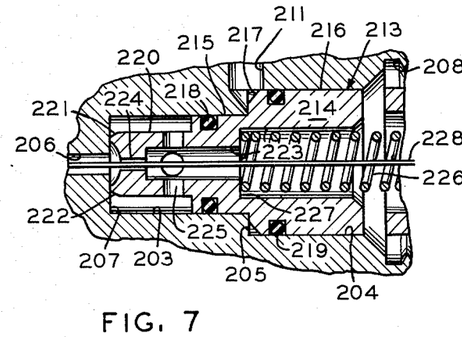
FIG. 7 is a greatly enlarged fragmentary view showing the damping valve portion of the modified control valve of FIG. 6.

Referring to FIGS. 6 and 7, a height control valve 201 is shown having substantially the same component parts and functioning in substantially the same manner as the previously described height control valve 1 with the following exceptions. The control valve 201 is provided with a housing 202 having stepped cross bores 203 and 204 with a shoulder 205 formed therebetween. A passage 206 is interposed between the recess 10 in the housing bore 3 and the end wall of the cross bore 203, and a valve seat 207 is provided on said end wall in circumscribing relation with the passage 206. A working or outlet port 208 is provided in alignment with the cross bore 204, and a fitting 209 is threadedly received in said working port having a passage 210 therethrough which receives the conduit 24. A damping passage 211 has one end intersecting with the cross bore 204 at the shoulder 205 and the other end thereof connecting with a damping port 212.

A damping valve 213 is provided with a body 214 having stepped peripheral surfaces 215 and 216 which are slidable in the cross bores 203 and 204, respectively, and a beveled radial shoulder 217 is formed between said peripheral surfaces. O-ring seals 218 and 219 are carried in the peripheral surfaces 216 and 217 in sealing engagement with the cross bores 203 and 204, respectively. The valve body 214 is provided with an integral extension 220 coaxial with the cross bore 203, and said extension has a sealing surface 221 on the free end 222 thereof. A flow passage 223 is axially provided through the valve body 214 and extension 220 having a restricted portion or orifice 224 extending through the annular sealing surface 221, and cross passages 225 are provided in said extension connecting said flow passage in open and relatively unrestricted pressure fluid communication with the cross bore 203. A valve spring 226 is interposed between a shoulder 227 formed in the flow passage 223 and the working port fitting 209 to normally bias the sealing surface 221 into sealing engagement with the valve seat 207 about the passage 206, and an orifice cleaning member or wire 228 extends coaxially through the flow passage 223 and orifice 224 having one end in the passage 206 and the other end abuttingly engaged between the spring 226 and the inlet fitting 209.

The control valve 201 is provided with a fluid pressure system 230 and an electrical circuit 231 having substantially the same component parts and functioning in substantially the same manner as the fluid pressuer system 16 and the electrical current 116 provided for the height control valve 101 with the following exceptions. A solenoid valve 232 is provided with spaced inlet, outlet and exhaust ports 233, 234, 235, respectively, which are controlled by a spring loaded plunger member 236 in response to energization or de-energization of solenoid coils 237 connected between the terminals 117 and 118. A conduit 238 is interposed between the damping port 212 of the height control valve 201 and the outlet port 234 of the solenoid valve 232, and another conduit 239 connects the inlet port 233 of said solenoid valve with the conduit 22. In its normal inoperative or de-energized position, the plunger member 236 interrupts pressure fluid communication between inlet and outlet ports 233 and 234 and establishes pressure fluid communication between outlet and exhaust ports 234 and 235.

With the damping piston 213 in its flow restricting position as above described, the ingress and egress flow between the recess 10 in the housing bore 3 through the passage 206, the damping piston orifice 224 and axial passage 223, the fitting passage 210 and the conduit 24 is restricted by the orifice 224 to minimize the ingress and egress flow when the height control valve 201 is undesirably actuated in response to oscillatory movements of the lever 41 due to the intermittent undesired displacement of the sprung mass effected by vibration, bumps in the roadway, et cetera, as previously discussed.

When the load on the sprung mass is changed from the normal operating positions by passengers entering or leaving the vehicle, the door jam switch 126 is closed upon opening of the vehicle door. Closure of the door jam switch 126 completes the circuit 231 to energize the solenoid coils 237, and the plunger 236 is magnetically energized leftwardly to its operative or energized position in response to the energization of said solenoid coils. In its operative position, the plunger 236 establishes pressure fluid communication between the solenoid valve inlet and outlet ports 233 and 234 and interrupts pressure fluid communication between the solenoid valve outlet and exhaust ports 234 and 235. In this manner, pressure fluid flows from the reservoir 18 through conduits 20, 22 and 212, the solenoid valve inlet and outlet ports 233 and 234, the conduit 238, the damping port 212 and passage 211 of the height control valve 201 into the cross bore 204. The established fluid pressure in the cross bore 204 acts on the effective area of the shoulder 217 of the damping piston 213 to move said damping piston rightwardly against the force of the spring 226 thereby disengaging the sealing surface 221 from the valve seat 207. When the height control valve 201 is functioning to effect correcting ingress flow of pressure fluid from the recess 10 in the housing 3 to inflate the air spring 23, such ingress flow passes through the passage 206, between the unseated damping piston sealing surface 221 and the seat 207 into the cross bore 203 and therefrom through the damping piston cross passages 225 and axial passages 223, the working port 210 and conduit 24 into said air spring. Of course, when the height control valve 201 is functioning to effect correcting egressing pressure fluid flow to deflate the air spring 23, such egressing flow will be in the direction opposite to the ingress flow. When the vehicle door is closed, the door jam switch 126 opens breaking the circuit 231 to de-energize the solenoid coils 237, and the spring-loaded plunger 236 returns to its normal inoperative position. In this manner, pressure fluid communication is again interrupted between the solenoid inlet and outlet ports 233 and 234, and pressure fluid is exhausted from the cross bore 204 through the damping passage and ports 211 and 212, the conduit 227, and the solenoid valve outlet and exhaust ports 234 and 235. Upon exhaustion of the fluid pressure from the damping bore 204, the force of the spring 226 returns the damping piston 213 to its original flow restricting position with the sealing surface 221 in sealing engagement with the seat 206.

To move the height control valve 201 to the raised position, the push-pull valve 21 is actuated from its normal exhaust position to its operative position admitting pressure fluid from the reservoir 18 through the conduit 20 and the control port 15 of said height control valve into the annular recess 51 and therefrom through the passage 52 in the cylinder 44 into the control chamber 57. As previously described, the admission of fluid pressure into the control chamber 57 actuates the component parts of the height control valve 201 upwardly to effect the ingress flow of pressure fluid and inflate the air springs 23 to its raised position. The admission of pressure fluid to the control chamber 57 through the conduit 20 also serves to actuate the fluid pressure responsive make or break type electrical switch 121 to complete the circuit 231 and energize the solenoid coils 237. Energization of the solenoid coils 237 magnetically energizes the solenoid plunger 236 to its operative position effecting pressure fluid flow from the reservoir 18 into the cross bore 204, and the fluid pressure so established in the cross bore 204 moves the damping piston 213 rightwardly from its flow restricting position to allow substantially unrestricted or unorificed flow of ingressing pressure fluid from the recess 10 in the housing bore 3 to inflate the air springs 23, as previously described. In this manner, the air spring 23 is inflated by the unrestricted flow of ingressing pressure fluid to move the sprung mass to its raised position.

To return the sprung mass to the normal operating position, the push-pull valve 21 is returned to its normal exhausting position to vent the control chamber 57 in the height control valve 201 to atmosphere which, of course, causes said height control valve to function to effect a correcting egressing flow from the air spring 23. Actuation of the push-pull valve 21 to its exhaust position also vents the conduit 20 to atmosphere causing the fluid pressure responsive switch 121 to break the circuit 230 and de-energize the solenoid coils 237. Upon de-energization of the solenoid coils 237, the spring-loaded plunger 236 moves to its inoperative position interrupting pressure fluid communication between the solenoid valve inlet and outlet ports 233 and 234 and venting the cross bore 204 to atmosphere through the damping passage and ports 211 and 212 and the solenoid valve outlet and exhaust ports 234 and 235. With the cross bore 204 exhausted, the damping piston spring 226 again returns the damping piston 213 to its flow restricting position with the sealing surface 221 thereof in sealing engagement with the valve seat 207. In this manner, the egressing flow of pressure fluid from the air spring 23 is orificed or passes through the damping piston orifice 224 causing a slower return of the sprung mass to its normal operating position to prevent a sudden drop of said sprung mass to its normal operating position.

Figure 8:
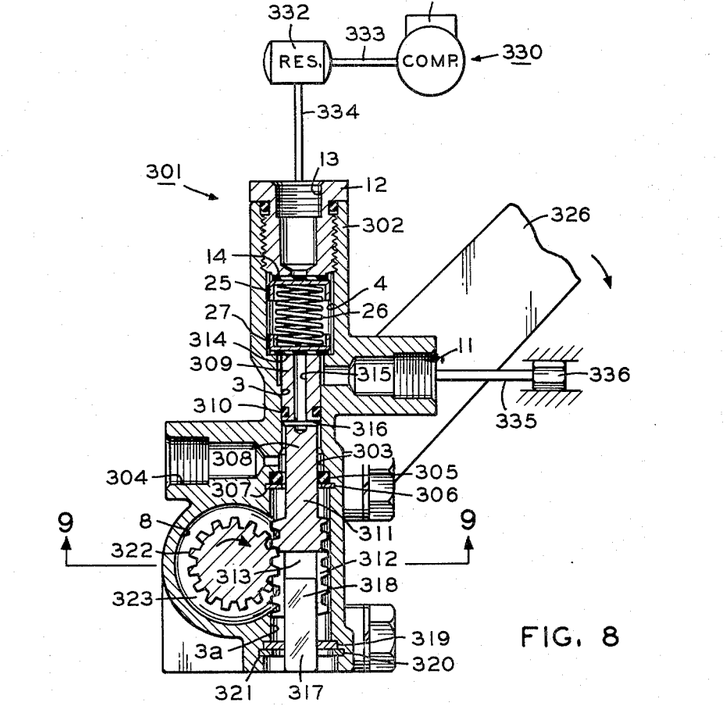
FIG. 8 is a diagrammatic view of a pressure fluid suspension system showing another modified control valve therein in cross section.
Figure 9:
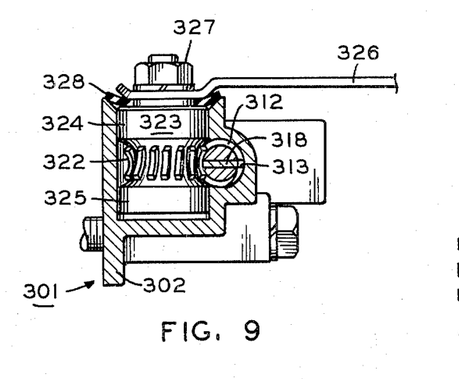
FIG. 9 is a cross-sectional view taken along the line 9—9 of FIG. 8.

Referring now to FIGS. 8 and 9, a height control valve 301 is shown having substantially the same component parts and functioning in substantially the same manner as the previously described height control valve 1 with the following exceptions. The height control valve 301 is provided with a housing 302 which is normally mounted on or connected with the vehicle sprung mass, and the housing bore 3 is provided with an annular recess 303 adjacent the juncture of the stepped housing bores 3 and 3a. An exhaust port 304 is provided in the housing 302 intersecting with the recess 303, and O-ring seal 305 is positioned in sealing engagement with the housing bore 3a and the shoulder formed at the juncture of stepped housing bores 3 and 3a by a snap ring 306 which is received in a suitable groove 307 in the housing bore 3a. A valve operating or driven member 308 is provided with an upper tubular exhaust stem portion 309 slidable in the housing bore 3 and carrying an O-ring 310 in sealing engagement with the housing bore 3, a reduced midportion 311 which is sealably engaged with the O-ring seal 305 and extends into the housing bore 3a, and a lower worm gear portion 312 having a keyway or slot 313 therein. An exhaust valve seat 314 is provided on the upper end of the stem 309 normally in sealing engagement with the check valve 27 and in circumscribing relation with one end of an axial exhaust passage 315 in said stem. The other end of the exhaust passage 315 intersects with a cross passage 316 provided in the mid-portion 311 of the member 308 and connecting said exhaust passage with the recess 303 and exhaust port 304.

A manually rotatable driving member 317 is provided with a key 318 having an upper end slidably and drivingly received in the keyway 313 in the worm gear 312, and a washer 319 is fixedly connected with said key adjacent the lower end thereof. The washer 319 is rotatably received in the housing bore 5 between the shoulder 7 and a snap ring 320 positioned in a suitable groove 321 in said housing bore to retain the key 318 and washer 319 against displacement.

A pinion gear 322 is normally meshed with the worm gear 312 adjacent the mid-portion thereof, and said pinion gear is integrally formed on a gear control member 323 between trunnions 324 and 325 which are rotatably mounted in the housing transverse bore 8. The gear control member 323 is connected with one end of an actuating lever or arm 326 by suitable means, such as a stud and lock washer assembly 327, and the other end of said lever is connected with the unsprung mass of the vehicle. A resilient washer or boot 328 is interposed between the lever 326 and housing 302 about the transverse bore 8 to prevent the entry of foreign particles.

A fluid pressure system, indicated generally at 330, includes a compressor 331 connected with a reservoir 332 by a conduit 333, said compressor and reservoir forming a source of pressure for the height control valve 301. The reservoir 332 is connected with the inlet port 13 of the height control valve 301 by a conduit 334, and another conduit 335 is interposed between the working port 11 of said height control valve and an air spring 336 which is positioned between the sprung and unsprung masses of the vehicle.

In order to supply fluid pressure to initially inflate the air spring 336 to the desired height or normal riding position, the operator merely rotates the key 318. This rotational movement is imparted to the driving member 308 by the key 318 and moves the worm gear 312 upwardly on the pinion gear 322 thereby effecting upward movement of said driving member relative to said pinion gear. The upward movement of the driven member 308 initially engages the valve seat 314 with the check valve 27 closing the exhaust passage 315 and subsequently unseating said check valve from the seat 6 to permit ingress flow of pressure fluid from the reservoir 332 through the conduit 334, the inlet port 13 of the height control valve 301, the housing bore 4, the recess 10 of the housing bore 3, the working port 11, and conduit 335 to the air spring 336. In this manner, the air spring 336 is initially inflated, and the sprung mass is moved upwardly relative to the unsprung mass which causes a resulting clockwise rotation (in the direction of the arrow) of the actuating lever 326 and the pinion gear 322. Since the pinion gear 322 is meshed with the worm gear 312, the clockwise rotation of said pinion gear moves the driven member 308 downwardly so that said pinion gear is again engaged with the center or mid-portion of said worm gear. The driven member 308 is so moved downwardly to a position which allows the check valve 27 to sealably re-engage the seat 6 while the exhaust valve seat 314 remains in sealing engagement with said check valve to maintain the exhaust passage 315 closed. The above-described operation for initially inflating the air spring 336 can be repeated until the normal or desired riding height for the vehicle is attained.

If it is necessary to deflate the air spring 336 to the desired riding height, the operator merely rotates the key 318 in the opposite direction to impart an opposite rotation to the driven member 308. The rotational movement imparted to the driven member 308 moves the worm gear 312 downwardly on the pinion gear 322 thereby effecting downward movement of said driven member relative to said pinion gear. As a result of the downward movement of the driven member 308, the stem valve seat 314 is disengaged from the check valve 27 to permit exhaustion or egressing flow of pressure fluid from the air spring 336 through the conduit 315, the working port 11, the recess 10 of the housing bore 3, the exhaust passage and cross passage 315 and 316 in said driven member, the annular recess 303 in the housing bore 3a and the exhaust port 304 to the atmosphere. The deflation of the air spring allows the sprung mass to move toward the unsprung mass effecting counterclockwise rotation of the lever 326 and the pinion gear 322. Since the pinion gear 322 and worm gear 312 are meshed, the counterclockwise rotation of said pinion gear moves the driven member 308 upwardly to sealably re-engage the stem valve seat 314 with the check valve 27 closing the exhaust passage 315 and interrupting the egress flow of pressure fluid while allowing said check valve to remain in sealing engagement with the seat 6.

With the sprung mass positioned at the normal or desired riding height, an increase or decrease in the weight carried by the sprung mass results in displacement of said sprung mass from the desired riding height. If the sprung mass is displaced above the desired riding height, the upward movement thereof effects resultant clockwise rotation of the lever 326 and pinion gear 322, and said pinion gear meshes with the worm gear 312 to move the driven member 308 downwardly and effect exhaust or egressing pressure fluid flow from the air spring 336, as described above. As the sprung mass is returned to the desired riding height by such deflation of the air spring 336, the lever 326 and pinion gear 322 are moved in a counterclockwise direction which moves the driven member 308 upwardly to its original operating position. From the above, it is obvious that movement of the component parts of the height control valve 301 are reversed when the desired riding height of the sprung mass is decreased.

It is now apparent that novel height control valves and systems therefore meeting the objects set out hereinbefore are provided and that changes or modifications to the precise configurations, shapes, or details of the constructions set forth in the disclosure by way of illustration may be made by those skilled in the art without departing from the spirit and scope of the invention as defined by the claims which follow.

What I claim is:

1. A control valve for fluid pressure comprising a housing having inlet, working and exhaust ports therein, valve means normally interrupting pressure fluid communication between said inlet and working ports, valve control means for operative engagement with said valve means and controlling pressure fluid communication between said working and exhaust ports, a worm gear portion on said valve control means, and driving means in said housing having gear means thereon drivingly engaged with said worm gear portion, said worm gear portion being adjustably movable on said gear means in response to an applied force on said valve control means to move said valve control means relative to said driving means to a normal operating position in engagement with said valve means and interrupting pressure fluid communication between said working and exhaust ports.

2. A control valve for fluid pressure comprising a housing having inlet, working and exhaust ports therein, valve means normally interrupting communication between said inlet and working ports, valve control means for operative engagement with said valve means and controlling communication between said working and exhaust ports, driving means in said housing and drivingly engaged with said valve control means, and adjusting means connected with said valve control means, said adjusting means being movable in response to an applied force thereon to adjustably move said valve control means relative to said driving means to a normal operating position in engagement with said valve means and interrupting communication between said outlet and exhaust ports.

3. A control valve for fluid pressure comprising a housing having inlet, working and exhaust ports therein, valve means normally urged to a closed position in said housing to interrupt pressure fluid communication between said inlet and working ports, valve control means for operative engagement with said valve means, an exhaust opening in said valve control means for pressure fluid communication between said outlet and exhaust ports, driving means in said housing and connected in driving engagement with said valve control means, and adjusting means connected with said valve control means and movable in response to an applied force thereon to adjustably move said valve control member relative to said driving means to a normal operating position in engagement with said valve means, said exhaust opening being closed upon the engagement of said valve control means and valve means to normally interrupt presure fluid communication between said outlet and exhaust ports.

4. A control valve for fluid pressure comprising a housing having inlet, working and exhaust ports, valve means controlling pressure fluid communication between said inlet and working ports, valve control means slidable in said housing, a valve seat on said valve control means for engagement with said valve means, exhaust passage means extending through said valve seat and controlling pressure fluid communication between said working and exhaust ports, adjusting means in said housing connected with valve control means and movable in response to an applied force to initially move said valve control means to a normal operating position to engage said valve seat with said valve means, said exhaust passage means being closed upon the engagement of said valve seat and valve means to normally interrupt pressure fluid communication between said outlet and exhaust ports, and driving means rotatably mounted in said housing and drivingly engaged with said valve control means for concert movement in response to an applied force, said valve control means and driving means being concertly movable relative to said adjusting means in response to the applied force to move said valve means to a position establishing pressure fluid communication between said inlet and working ports or to disengage said valve seat from said valve means to open said exhaust passage means and establish pressure fluid communication between said working and exhaust ports.

5. A control valve for fluid pressure comprising a housing having inlet, working and exhaust ports therein, valve means controlling pressure fluid communication between said inlet and working ports, valve control means normally engaged with said valve means and controlling pressure fluid communication between said working and exhaust ports, a worm gear portion on said valve control means, driving means in said housing having gear means thereon drivingly engaged with said worm gear portion, said driving means being movable in one direction in response to an applied force to drive said valve control means and valve means to a position establishing pressure fluid communciation between said inlet and working ports and in another direction to drive said valve control means to another position disengaged from said valve means to establish pressure fluid communication between said working and exhaust ports, and other means connected with said valve control means and responsive to an applied force thereon to threadedly move said worm gear portion on said gear means and effect movement of said valve control means relative to said driving means to said first named or other positions.

6. A control valve for fluid pressure comprising a housing having inlet, working and exhaust ports therein, valve means normally interrupting pressure fluid communication between said inlet and working ports, valve control means slidable in said housing and normally engaged with said valve means to interrupt pressure fluid communication between said working and exhaust ports, a worm gear portion on said valve control means, driving means movably mounted in said housing, gear means on said driving means and drivingly engaged with said worm gear portion, said driving means being movable in response to an applied force in one direction to drive said valve control means and valve means to one position establishing pressure fluid communication between said inlet and working ports or movable in response to an applied force in another direction opposite to the one direction to drive said valve control means to another position disengaged from said valve means to establish pressure fluid communication between said working and exhaust ports, and selectively operable means in said housing and drivingly engaged with said valve control means, said selectively operable means being movable in response to an applied force thereon to threadedly move said worm gear portion on said gear means and drive said valve control means relative to said driving means to the one or other position.

7. A control valve for fluid pressure comprising a housing having inlet, working and exhaust ports therein, valve means normally urged to a closed position in said housing to interrupt pressure fluid communication between said inlet and working ports, a valve stem member slidable in said housing, exhaust passage means in said valve stem member, a valve seat on said valve stem member in circumscribing relation with said exhaust passage means, said valve seat being normally engaged with said valve means to close said exhaust passage means and interrupt pressure fluid communication between said working and exhaust ports, a worm gear portion on said valve stem member, driving means rotatably mounted in said housing and rotatable in one or an opposite direction in response to an applied force thereon, gear means on said driving means in driving engagement with said worm gear portion, the engagement between said gear means and worm gear portion serving to normally maintain said valve seat engaged with said valve means, said driving means being rotatable in the one direction by the applied force to concertly drive said valve stem member and valve means to one position establishing pressure fluid communication between said inlet and working ports or rotatable in the other direction by the applied force to drive said valve stem member relative to said valve means to another position to disengage said valve seat from said valve means, said exhaust passage means being opened upon the disengagement of said valve seat from said valve means to establish pressure fluid communication between said working and exhaust ports, and selectively operable means rotatable in said housing and drivingly engaged with said valve stem member, said selectively operable means being selectively rotatable in one and opposite directions in response to an applied force thereon to threadedly move said worm gear portion on said gear means and effect movement of said valve stem member relative to said driving means to the one and other positions.

8. A control valve for fluid pressure comprising a housing having inlet and outlet chambers therein, a connecting passage between said chambers, a first valve seat in said inlet chamber in circumscribing relation with said connecting passage, valve means normally urged into engagement with said first valve seat to close said connecting passage and interrupt pressure fluid communication between said chambers, valve control means slidable in said outlet chamber, exhaust passage means on said valve control means, a second valve seat on said valve control means in circumscribing relation with said exhaust passage means, said second valve seat being normally engaged with said valve means to close said exhaust passage means and interrupt pressure fluid communication between said outlet chamber and the atmosphere, a worm gear portion on said valve control means, driving means in said housing having gear means thereon drivingly engaged with said worm gear portion to normally position said second valve seat in engagement with said valve means, said driving means being movable in response to an applied force thereon to drive said valve control means in one direction to a position disengaging said valve means from said first valve seat to open said connecting passage and establish pressure fluid communication between said inlet and outlet chambers or movable in response to an applied force thereon to drive said valve control means in a direction opposite the one direction to another position disengaging said second valve seat from said valve means to open said exhaust passage means and establish pressure fluid communication between said outlet chamber and the atmosphere, and other driving means in said housing drivingly engaged with said valve control means, said other driving means being selectively movable in one and opposite directions in response to an applied force to threadedly move said worm gear portion on said gear means and drive said valve control means relative to said driving means to the one and other positions.

9. A height control valve 4 for maintaining a predetermined position in the vertically spaced relationship between vehicle sprung and unsprung masses comprising a housing having inlet, working, exhaust and control ports therein, valve means controlling pressure fluid communication between said inlet and working ports, valve control means for operative engagement with said valve means and controlling pressure fluid communication between said working and exhaust ports, driving means drivingly engaged with said valve control means and operable in response to changes in the vertically spaced relationship of said masses to drive said valve control means and valve means in one direction to a position interrupting pressure fluid communication between said working and exhaust ports and establishing pressure fluid communication between said inlet and working ports and also to drive said valve control means in another direction relative to said valve means to another position establishing pressure fluid communication between said working and exhaust ports and interrupting pressure fluid communication between said inlet and working ports, and other driving means drivingly engaged with said valve control means and movable in response to fluid pressure at said control port to drive said valve control means relative to said first named driving means toward said one position for establishing a new predetermined position between said masses.

10. A height control valve for maintaining a predetermined position in the vertically spaced relationship between vehicle sprung and unsprung masses comprising a housing having inlet, working, exhaust and control ports therein, valve means normally interrupting pressure fluid communication between said inlet and working ports, valve control means normally engaged with said valve means and interrupting pressure fluid communication between said working and exhaust ports, and a pair of driving means connected in driving engagement with said valve control means, one of said driving means being operable in response to changes in the vertically spaced relationship of said masses to drive said valve control means and valve means to one position establishing pressure fluid communication between said inlet and working ports and also drive said valve control means relative to said valve means to another position establishing pressure fluid communication between said working and exhaust ports for re-establishing the predetermined position between said masses, and the other of said driving means being movable in response to fluid pressure at said control port to drive said valve control means relative to said one driving means toward the one position and establish a new predetermined position between said masses.

11. A height control valve for maintaining a predetermined position in the vertically spaced relationship between vehicle sprung and unsprung masses comprising a housing having inlet, working, exhaust and control ports therein, valve means normally interrupting pressure fluid communication between said inlet and working ports, valve control means normally engaged with said valve means and interrupting pressure fluid communication between said working and exhaust ports, a pair of driving means connected in driving engagement with said valve control means, one of said driving means being movable in response to changes in the vertically spaced relationship of said masses to actuate said valve control means and valve means and establish pressure fluid communication between said working port and one of said inlet and exhaust ports for re-establishing the predetermined position between said masses, the other of said driving means being movable from its normal operating position in response to fluid pressure at said control port to drive said valve control means relative to said one driving means and actuate said valve means to provide pressure fluid communication between said working and exhaust ports and thereby establish a new predetermined position between said masses, and means for returning said other driving means toward the normal operating position thereof upon the reduction of the fluid pressure at said control port to disengage said valve control means from said valve means and establish pressure fluid communication between said exhaust and working ports until the vertical relationship between said masses in the first named predetermined position is re-established.

12. A height control valve for maintaining a predetermined position in the vertically spaced relationship between vehicle sprung and unsprung masses comprising a housing having inlet, working, exhaust and control ports therein, valve means controlling pressure fluid communication between said inlet and working ports, valve control means normally engaged with said valve means and controlling pressure fluid communication between said working and exhaust ports, driving means in said housing in driving engagement with said valve control means and movable in response to changes in the vertically spaced relationship of said masses to drive said valve control means and valve means to one position to establish pressure fluid communication between said inlet and working ports and also drive said valve control means relative to said valve means to another position and establish pressure fluid communication between said working and exhaust ports for re-establishing the predetermined position between said masses, and means including rotatable means drivingly engaged with said valve control means and movable in response to fluid pressure at said control port to rotatably drive said valve control means relative to said first named driving means toward the one position to establish a new predetermined position between said masses.

13. A height control valve for maintaining a predetermined position in the vertically spaced relationship between vehicle sprung and unsprung masses comprising a housing having inlet, working, exhaust and control ports therein, valve means normally interrupting pressure fluid communication between said inlet and working ports, driving means movable in said housing, valve control means normally engaged with said valve means and interrupting pressure fluid communication between said working and exhaust ports, said valve control means being connected in driven engagement with said driving means and for movement relative thereto, said driving means being movable in response to changes in the vertically spaced relationship of said masses to drive said valve control means and establish pressure fluid communication between said working port and one of said inlet and exhaust ports for re-establishing the predetermined position between said masses, and means for selectively establishing a new predetermined position between said masses including other driving means connected in driving engagement with said valve control means, an expansible chamber in said housing in open pressure fluid communication with said control port, resiliently urged means normally opposing expansion of said chamber and connected with said other driving means to effect reciprocal movement thereof in one and opposite directions, said resiliently urged means being responsive to fluid pressure in said control port to move said other driving means in the one direction, means in said housing in sliding engagement with said other driving means for translating movement thereof in the one direction into rotary movement, and abutment means on said valve control means engaged with said other driving means upon rotation thereof to move said valve control means relative to said first named driving means and to move said valve means to a position establishing pressure fluid communication between said inlet and working ports for establishing a new predetermined position between said masses.

14. A height control valve for maintaining a predetermined position in the vertically spaced relationship between vehicle sprung and unsprung masses comprising a housing having inlet, working, exhaust and control ports therein, valve means normally interrupting pressure fluid communication between said inlet and working ports, valve control means normally engaged with said valve means and interrupting pressure fluid communication between said working and exhaust ports, a worm gear portion on said valve control means, driving means in said housing having gear means thereon drivingly engaged with said worm gear portion, said driving means being movable in response to changes in the vertically spaced relationship of said masses to drive said valve control means and valve means to one position establishing pressure fluid communication between said working and inlet ports and to drive said valve control means relative to said valve means to another position establishing pressure fluid communication between said working and exhaust ports for re-establishing the predetermined position between said masses, other driving means drivingly engaged with said valve control means, an expansible chamber in said housing connected in open pressure fluid communication with said control port, resiliently urged means normally opposing expansion of said chamber and drivingly engaged with said other driving means, said resiliently urged means being responsive to fluid pressure at said control port to drive said other driving means, and means positioned in said housing in motion translating engagement with said other driving means to impart rotational movement thereto when said other driving means is driven by said resiliently urged means, said valve control means being rotatably driven relative to said first named driving means by said other driving means to threadedly move said worm gear portion on said gear means and move said valve means toward the one position thereby establishing a new predetermined position between said masses.

15. A control valve for fluid pressure comprising a housing having inlet, working, exhaust and control ports therein, valve means normally interrupting pressure fluid communication between said inlet and working ports, valve control means normally engaged with said valve means and interrupting pressure fluid communication between said working and exhaust ports, a worm gear portion on said valve control means, driving means rotatably mounted in said housing, gear means on said driving means drivingly engaged with said worm gear portion, a keyway in said valve control means, a key slidable in said keyway and in rotatable driving engagement with said valve control means, an expansible chamber in said housing connected in open pressure fluid communication with said control port, resiliently urged means normally opposing expansion of said chamber and drivingly engaged with said key, means positioned in said housing and having a motion translating slot therein, a helical portion on said key and slidable in said slot, said resiliently urged means being responsive to fluid pressure at said control port to drive said key and move said helical portion through said slot and impart rotary movement to said key and valve control means, and said worm gear portion being threadedly movable on said gear means in response to the rotary movement to effect upward movement of said valve control means relative to said driving means and move said valve means to a position establishing pressure fluid communication between said inlet and working ports.

16. A control valve for fluid pressure comprising a housing having inlet, working, exhaust and control ports therein, valve means normally interrupting pressure fluid communicating between said inlet and working ports, valve control means normally engaged with said valve means and interrupting pressure fluid communication between said working and exhaust ports, a worm gear portion on said valve control means, driving means rotatably mounted in said housing and having gear means thereon connected in driving engagement with said worm gear portion, said driving means being rotatable in response to an applied force thereon in one direction to drive said valve control means and valve means to one position establishing pressure fluid communication between said inlet and working ports or movable in response to an applied force in a direction opposite the one direction to drive said valve control means relative to said valve means to another position establishing pressure fluid communication between said working and exhaust ports, a chamber in said housing connected in open pressure fluid communication with said control port, a piston slidable in said chamber, a guide member positioned in said housing and having a motion translating slot therein, a keyway in said valve control means, a key having one end slidable in said keyway in rotatable driving engagement with said valve control member and the other end thereof rotatably received by said piston, a helical portion on said key and slidable in said slot, said piston being movable in response to fluid pressure at said control port to drive said key and move said helical portion through said slot to impart rotary movement to said key and valve control means, and said worm gear portion being slidable on said gear means in response to the rotary movement of said valve control means to effect movement of said valve control means toward said one position relative to said driving means.

17. A control valve for fluid pressure comprising a housing having inlet, working, exhaust and control ports therein, valve means normally urged to a closed position in said housing to interrupt pressure fluid communication between said inlet and working ports, a valve stem member slidable in said housing, exhaust passage means in said valve stem member, a valve seat on one end of said valve stem member in circumscribing relation with said exhaust passage means, said valve seat being normally engaged with said valve means to close said exhaust passage means and interrupt pressure fluid communication between said working and exhaust ports, a worm gear portion on said valve stem member adjacent to the other end thereof, driving means rotatable in said housing in one or an opposite direction in response to an applied force thereon, gear means on said driving means in driving engagement with said worm gear portion, the engagement between said gear means and worm gear portion serving to normally maintain said valve seat engaged with said valve means, said driving means being rotatable in the one direction to concertly drive said valve stem member and valve means to one position establishing pressure fluid communication between said inlet and working ports or rotatable in the opposite direction to drive said valve stem member relative to said valve means to disengage said valve seat from said valve means and establish pressure fluid communication between said working and exhaust ports through said exhaust passage means, a chamber in said housing connected in open pressure fluid communication with said control port, a piston slidable in said chamber and having a recess in one end thereof, a guide member fixedly positioned in said housing, a motion translating slot in said guide member, a keyway on the other end of said valve stem member, a key having one end slidable in said keyway in rotatable driving engagement with said valve stem member and the other end thereof rotatable in said piston recess, a helical portion on said key and slidable in said motion translating slot, said piston being movable in response to fluid pressure at said control port to drive said key and move said helical portion through said slot to impart rotary movement to said key and valve stem member, and said worm gear portion being slidable on said gear means in response to the rotary movement of said valve stem member to effect movement of said valve stem member towards the one position relative to said driving means.

18. A control valve for fluid pressure comprising a housing having inlet, outlet, exhaust and control ports therein, valve means normally interrupting pressure fluid communication between said inlet and working ports, valve control means normally engaged with said valve means and interrupting pressure fluid communication between said working and exhaust ports, a worm gear portion on said valve control means, a pair of driving means rotatably mounted in said housing for driving engagement with said valve control means, one of said driving means having gear means thereon connected in driving engagement with said worm gear means, said one driving means being rotatable in response to an applied force thereon to drive said valve control means relative to the other of said driving means in one direction to concertly move said valve means to one position establishing pressure fluid communication between said inlet and working ports or in a direction opposite the one direction to another position disengaged from said valve means and establishing pressure fluid communication between said working and exhaust ports, a keyway in said valve control means, a key connected with said other driving member and slidable in said keyway in rotatable driving engagement with said valve control means, said other driving member being rotatable in response to an applied force gear means to effect movement of said valve control means, and slidably move said worm gear portion on said gear means to effect movement of said volve control means relative to said one driving means in the one or opposite direction to the one or other positions, a motion conversion slot said other driving member, a helical portion on said key and slidable in said motion conversion slot, an expansible chamber in said other driving means, passage means within said other driving means and housing connecting said chamber in open pressure fluid communication with said control port, and resiliently urged means connected in driving engagement with said key and normally opposing expansion of said chamber, said resiliently urged means being movable in response to fluid pressure at said control port to drive said key in the one direction and move said helical portion through said motion conversion slot to impart rotary movement to said key and valve control means, and said worm gear portion being slidable on said gear means in response to the rotary movement of said valve control means to effect movement thereof in the one direction to the one position relative to said one and other driving means.

19. A height control valve for maintaining a predetermined position in the vertically spaced relationship between vehicle sprung and unsprung masses, comprising a housing having inlet, working and exhaust ports therein, valve means normally interrupting pressure fluid communication between said working and inlet ports when said masses are in said predetermined position, valve control means engaged with said valve means to interrupt pressure fluid communication between said working and exhaust ports when said masses are in said predetermined position and including a driving portion operable in response to changes in the vertically spaced relationship of said masses from said predetermined position and a driven portion having a driven connection with said driving portion and being actuated thereby relative to said valve means and also to move said valve means to selectively establish pressure fluid communication between said working port and one of said inlet and exhaust ports for re-establishing said predetermined position between said masses, and other means independent of said driving poriton for actuating said driven portion to adjust the driven connection between said driving and driven portions and establish a new predetermined position between said sprung and unsprung masses.

20. A height control valve for maintaining a predetermined position in the vertically spaced relationship between vehicle sprung and unsprung masses comprising a housing having inlet, working, exhaust and control ports therein, valve means normally interrupting pressure fluid communication between said working and inlet ports and valve control means normally engaged with said valve means to interrupt pressure fluid communication between said working and exhaust ports when said masses are in said predetermined position, said valve control means including a driving portion operable in response to changes in the vertically spaced relationship of said masses from said predetermined position and a driven portion having a driving connection with said driving portion and being actuated thereby relative to said valve means and also to move said valve means to selectively establish pressure fluid communication between said working port and one of said inlet and exhaust ports for re-establishing said predetermined position between said masses, and driving means independent of said driving portion movable in response to fluid pressure at said control port for actuating said driven portion to adjust the driven connection between said driving and driven portions and establish a new predetermined position between said masses.

References Cited by the Examiner
UNITED STATES PATENTS

| | | | |
|---|---|---|---|
| 2,841,178 | 7/58 | Schultz | 137—627.5 |
| 2,989,983 | 6/61 | Valentine | 137—627.5 XR |
| 2,997,314 | 8/61 | Hill | 137—627.5 XR |
| 3,071,394 | 1/63 | Miller | 137—627.5 XR |
| 3,122,378 | 2/64 | Parilla | 137—627.5 XR |

WILLIAM F. O'DEA, *Primary Examiner.*

UNITED STATES PATENT OFFICE
CERTIFICATE OF CORRECTION

Patent No. 3,209,784                                October 5, 1965

Robert E. Schwartz

It is hereby certified that error appears in the above numbered patent requiring correction and that the said Letters Patent should read as corrected below.

Column 1, line 57, for "self-leaning" read -- self-cleaning --; column 3, line 15, after "and" insert -- an --; column 5, line 56, for "control piston 53 to move said control piston upwardly" read -- control chamber 57. The fluid pressure so established in --; column 9, line 61, for "227" read -- 237 --; column 15, line 13, strike out "4"; column 16, line 67, before "driving" insert -- rotatable --; column 19, line 35, for "gear means to effect movement of said" read -- thereon to rotatably drive said key and --; line 37, for "volve" read -- valve --.

Signed and sealed this 20th day of December 1966.

(SEAL)

Attest:

ERNEST W. SWIDER                                EDWARD J. BRENNER

Attesting Officer                                       Commissioner of Patents